H. N. ANDERSON.
GEAR ROLLING MACHINE.
APPLICATION FILED OCT. 15, 1915.

1,240,918.

Patented Sept. 25, 1917.
6 SHEETS—SHEET 1.

Inventor
Harold N. Anderson,
By Kerr, Page, Cooper & Hayward
Attorneys

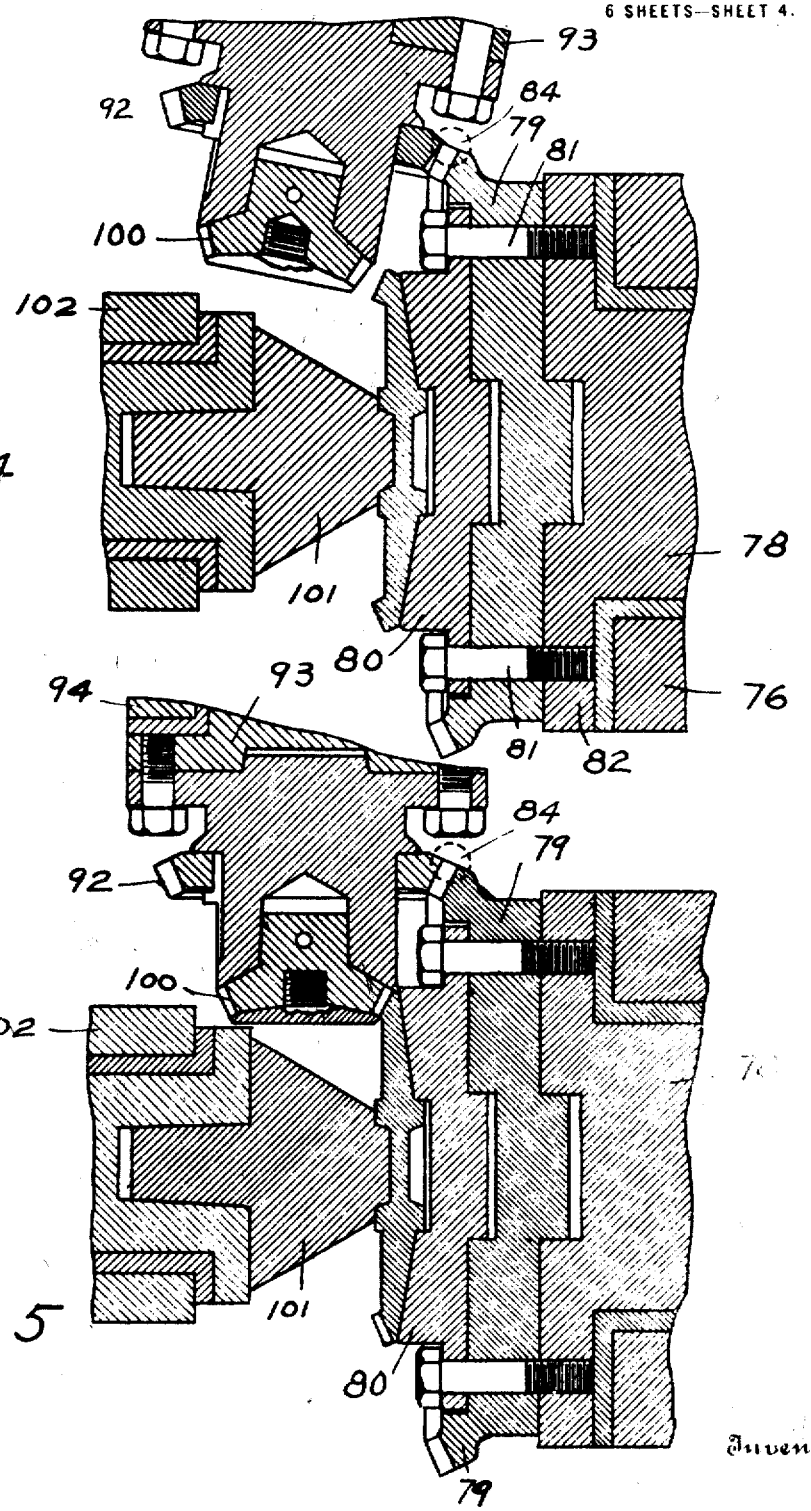

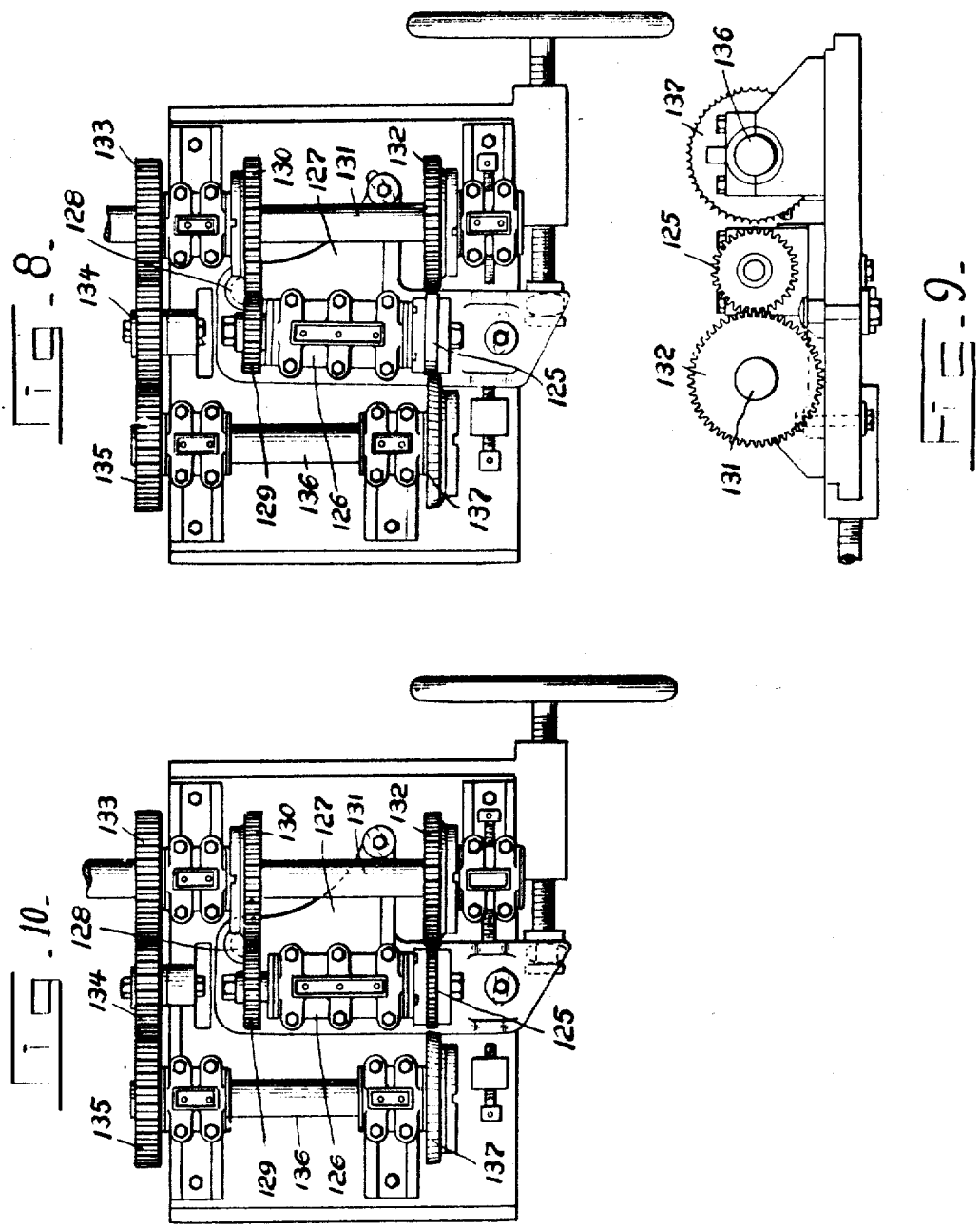

UNITED STATES PATENT OFFICE.

HAROLD N. ANDERSON, OF CLEVELAND, OHIO, ASSIGNOR TO THE ANDERSON ROLLED GEAR COMPANY, OF CLEVELAND, OHIO, A CORPORATION OF OHIO.

GEAR-ROLLING MACHINE.

1,240,918.  Specification of Letters Patent.  Patented Sept. 25, 1917.

Original application filed November 11, 1913, Serial No. 800,251. Divided and this application filed October 15, 1915. Serial No. 55,977.

*To all whom it may concern:*

Be it known that I, HAROLD N. ANDERSON, a citizen of the United States, residing at Cleveland, in the county of Cuyahoga and State of Ohio, have invented certain new and useful Improvements in Gear-Rolling Machines, of which the following is a full, clear, and exact description.

This application is a division from my earlier application, S. N. 800251, filed November 11th, 1913, and my invention relates to machines for forming teeth on gears by rolling a blank gear against a die-roll having a working face complementary in essential particulars to the form it is desired to impart to the blank. The die-roll may be a counterpart of the gear the blank is designed to mesh with, or it may be a roll which, though not like the gear the finished blank will be mated with, is capable of forming teeth of the desired form and size on the blank. The preferred embodiment of my invention herein shown is only adapted to roll teeth on bevel gears, but it is not therefore to be inferred or understood that the invention is limited to that use. On the contrary I also disclose a machine for rolling spur gears.

The principal advantages derived from rolling teeth on gears are:

First; the metal in the teeth, and in the part of the gear adjacent to the teeth, is thereby rendered very dense and fine grained.

Second; the grain, or fiber, of the metal is made to follow the contour of the teeth to a considerable extent, giving them very great strength.

Third; a high degree of accuracy, both as to size and form of teeth, is assured.

Fourth; gears can be produced by this method at a much smaller cost than by any other. This is particularly true of bevel gears, the production of which has in the past been very expensive.

Fifth; gears may be made of materials which can not be made into gears by any other process.

Sixth; gears made of materials which are hardened by sudden chilling; such, for example, as high carbon steel, may be hardened to a considerable extent while they are being rolled. The die-roll may be kept at a chilling temperature by a jet of cold air or water for this purpose.

While the valuable qualities of rolled gears are primarily due to the fact that they are rolled, these qualities, or at least part of them, are only attainable by maintaining synchronous relations between the teeth on the die-roll and the developing teeth on the blank while the latter are being formed. This synchronism may be maintained by driving the blank at such velocity that the imaginary line which, when the gear is finished, will be known as its pitch-line, will move from the beginning to the end of the tooth-forming operation at the same velocity as the pitch-line of the die-roll. The structure shown is provided with means for this purpose.

In the accompanying drawings: Figure 1 is a plan view of my machine with a blank in place to be rolled.

Fig. 4 is a sectional plan view of certain parts of Fig. 1.

Fig. 5 is a sectional plan view of certain part of Fig. 2.

Fig. 8 is a plan and Fig. 9 an end elevation of a machine for rolling spur gears.

Fig. 10 is a plan view similar to Fig. 8, but with the parts in the position they occupy when the rolling operation is completed.

Similar numerals refer to similar parts in all the views.

The following brief explanation of bevel gears will make what follows more easily understood: The teeth of bevel gears are constructed on imaginary pitch-cones in the same way that the teeth of spur gears are constructed on imaginary pitch cylinders. The pitch cones of a pair of bevel gears, if mounted on shafts in place of the bevel gears, would drive each other by frictional contact in the same velocity ratio as given by the bevel gears themselves. The angle formed by the axis and one side of the pitch cone is called the pitch cone angle and the sum of the two pitch cone angles equals the center angle. The center angle equals the angle formed by the axes of the cones, measured on the side on which the contact between the cones takes place. The pitch diameter is the diameter of the base of the cone, and since the pitch of a bevel gear is measured on a circle of the same diameter, "pitch circle" will be understood to mean a circle of the same diameter as the base of the cone. The pitch cone radius is the distance from the apex of the cone to the perimeter of its base. Treating the pitch circle as the perimeter of a plane, this imaginary plane will hereinafter be called the pitch plane of the gear.

Figure 1:
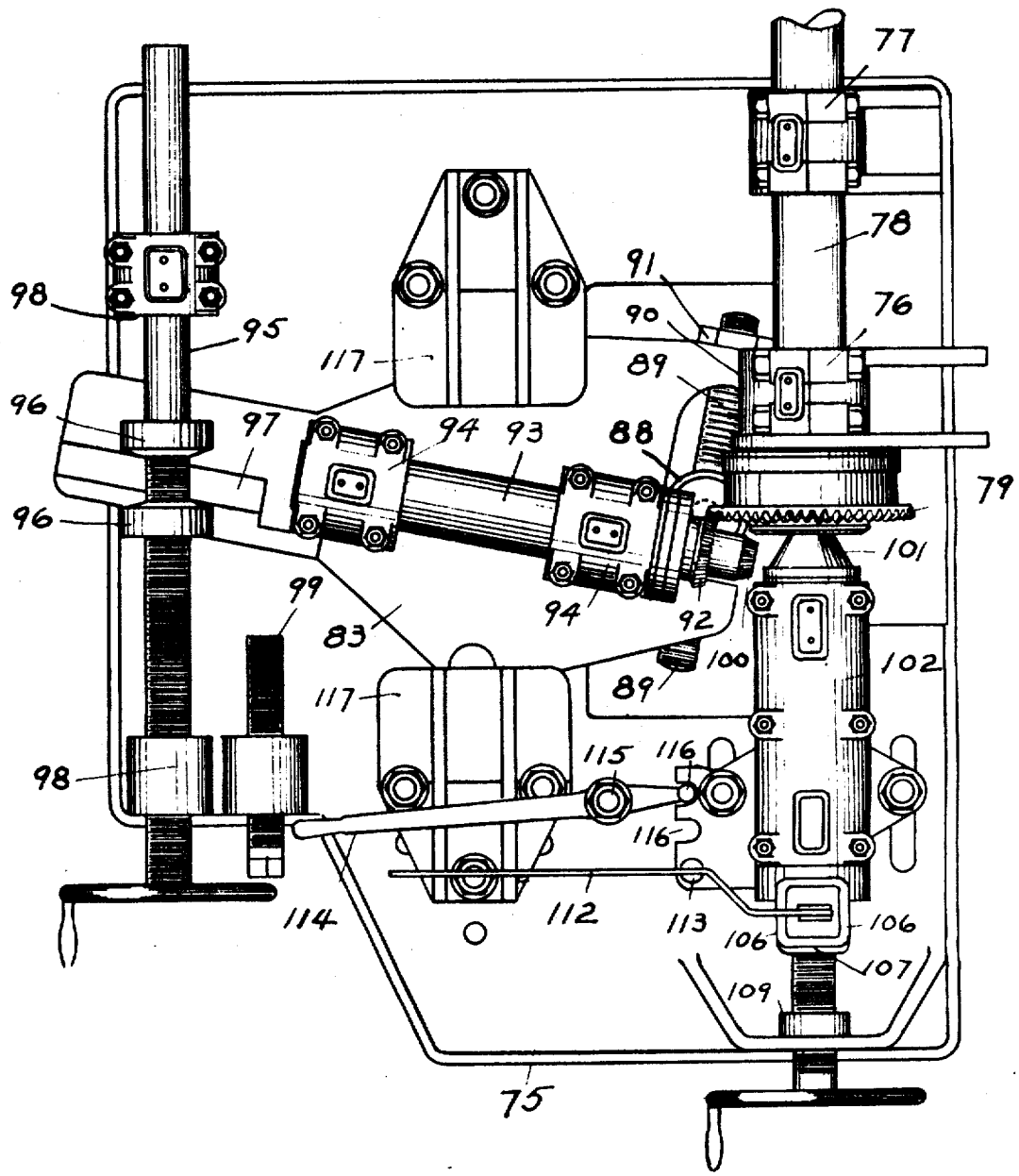
Figure 2:
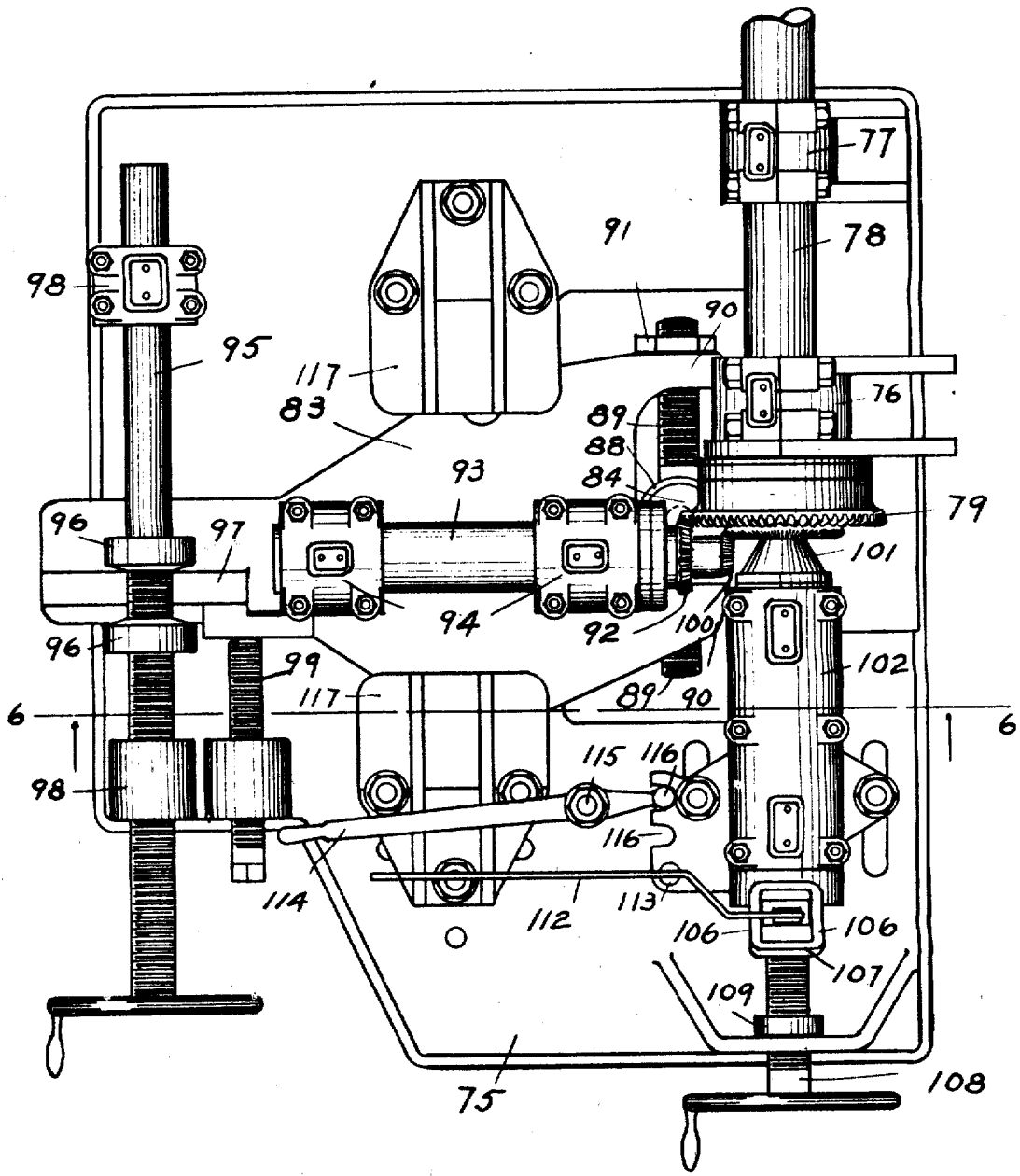
Fig. 2 is a similar view, with the parts in the positions they will occupy at the completion of a blank.
Figure 3:
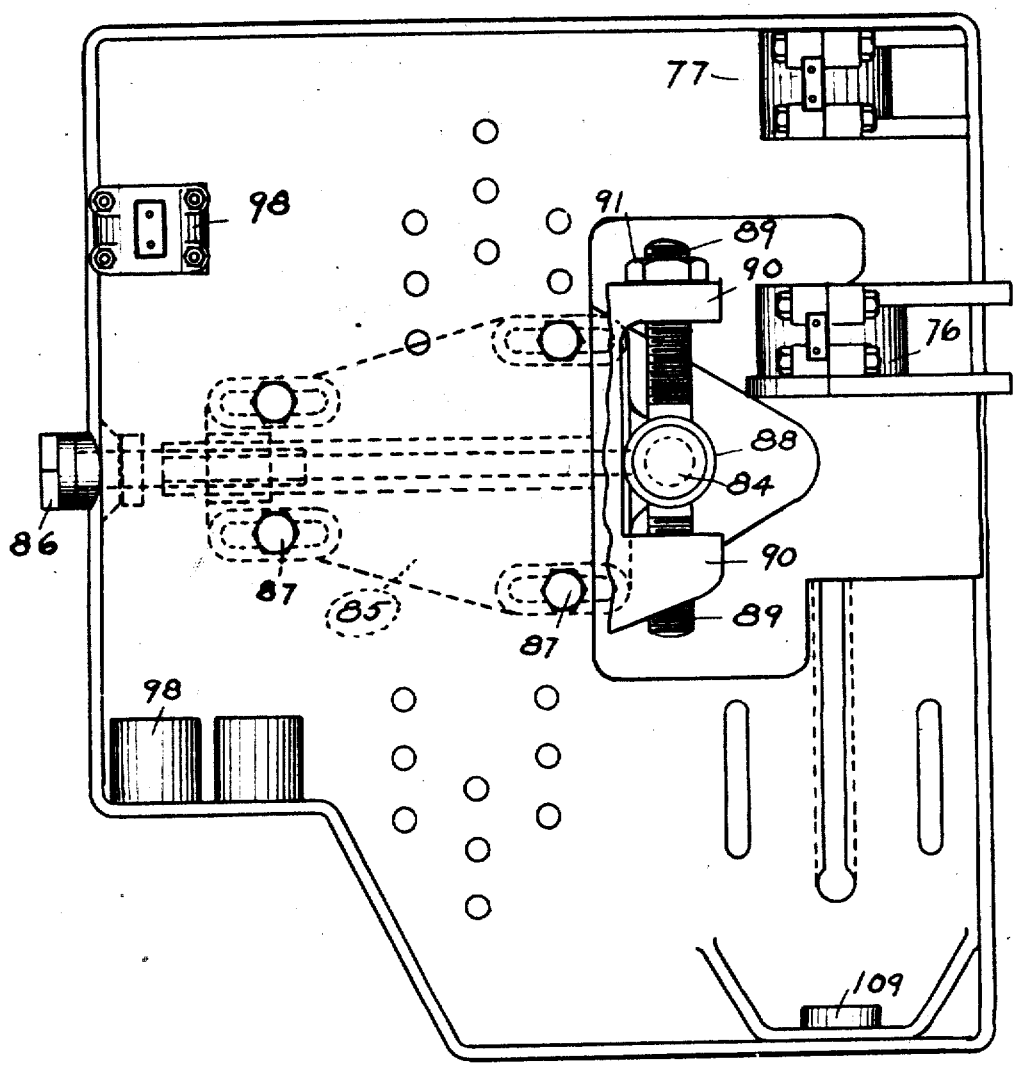
Fig. 3 is a plan view of the base of Figs. 1 and 2, showing certain details of construction.
Figure 6:
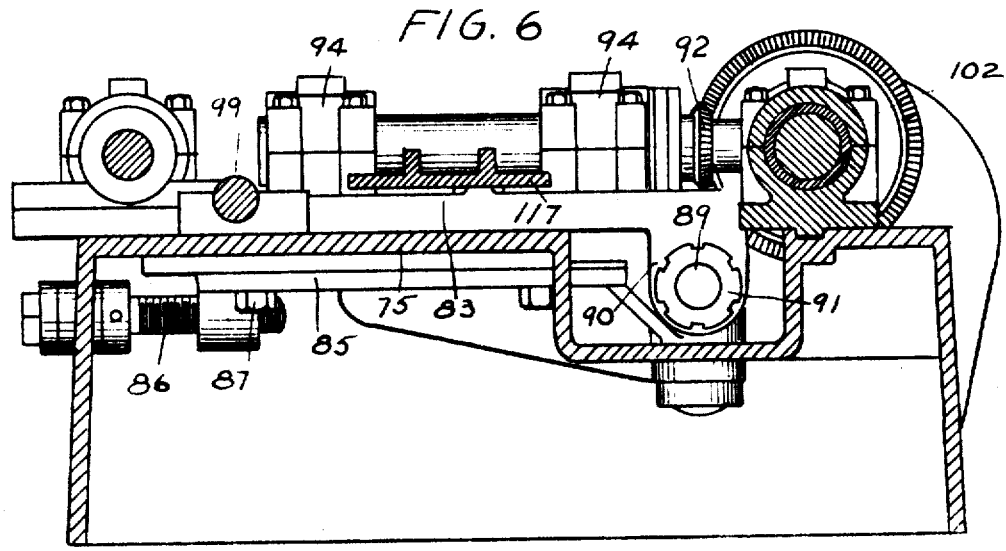
Fig. 6 is a sectional elevation of the machine shown in Figs. 1 and 2.

Referring now to the drawings, 75 is a base plate carrying bearings 76 and 77 and a shaft 78 mounted in the bearings. A timing gear 79 is secured to the end of the shaft by a plate 80 and screws 81, (Figs. 4 and 5) the shaft being provided with a flange 82 which abuts against the end of bearing 76. A superimposed plate 83 is pivoted at 84, the pivot being a stud rigidly set in a plate 85 arranged to move transversely with reference to the shaft 78. (Figs. 3 and 6). The plate is moved by a screw 86 and clamped in any desired position by bolts 87. The plate 83 is attached to the pivot by a sleeve 88 having studs 89 projecting from opposite sides, their axes being coincident and passing through the axis of the pivot, which studs pass through lugs 90 on the plate. The sleeve is maintained in any desired position by nuts 91 screwed on the studs and against the lugs 90. A timing gear 92 is secured to a shaft 93 which is mounted in bearings 94 carried by the plate 83. The plate is moved on the pivot by a screw 95 having collars 96 which embrace a rib 97 on the plate, the screw being supported by lugs 98 on the base 75, one of the lugs being threaded. A screw 99 acts as a stop to limit the movement of the plate, and the moving plate is held down by guide blocks 117. A die roll 100 is secured to the end of the shaft 93.

The timing gear 79 is so proportioned that its pitch plane is in line with the axis of pivot 84 and when moved to and fro by the screw 86 the axis of the pivot moves in a plane coincident with the pitch plane of gear 79. It is evident, therefore, that the pivot can be placed so that its axis just touches the pitch circle of gear 79. The timing gear 92 in turn is so proportioned that its pitch plane would if extended touch the common axis of studs 89. It is evident, therefore, that turning nuts 91 moves the axis of pivot 84 along a plane co-incident with the pitch plane of gear 92 and that the pivot can be placed where its axis just touches the pitch circle of said gear. If by these two adjustments the axis of the pivot is brought into contact with the pitch circles of gears 79 and 92 it is clear that the pitch circles will also touch, and that the axis of pivot 84 will then be tangent to both circles.

Figure 7:
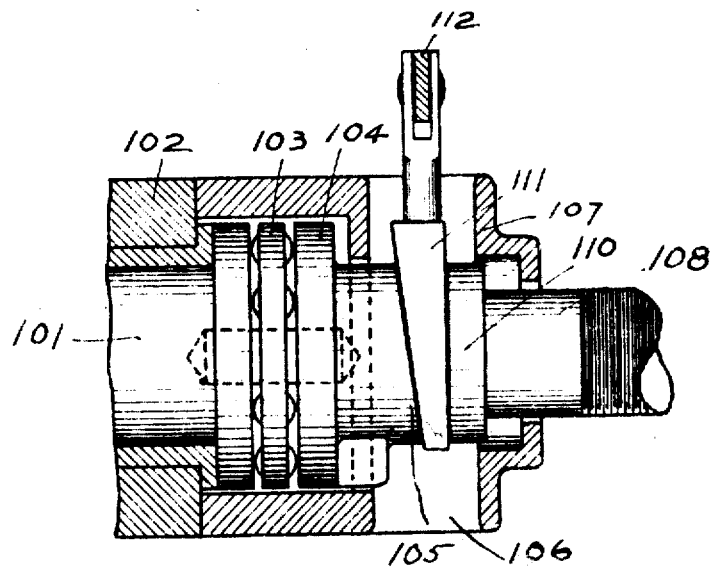
Fig. 7 is a sectional elevation of a portion of the blank clamping mechanism shown in Figs. 1 and 2.

The blank is clamped between the plate 80 and a plunger 101, which is mounted to rotate in a bearing 102 arranged to slide longitudinally on the base 75. The rear end of the plunger abuts against a ball thrust-bearing 103 (Fig. 7) which in turn abuts against a non-rotatable disk 104 located in the rear part of the bearing 102. The disk is carried by a shank 105, which, passing through the thrust-bearing housing wall, terminates in a recess formed by two side walls 106 and a rear wall 107. A screw 108 mounted in the threaded lug 109 on the base 75 passes through a hole in the rear wall 107 and terminates in a disk shaped head 110. A wedge 111 is adapted to drop in between the head 110 and the end of the shank 105, the end of the shank being cut on an angle so as to lie flat against the inclined face of the wedge. The wedge is attached to a lever 112 which is fulcrumed at 113 on a pedestal attached to the base of the bearing 102. The object of the wedge is to permit of quick work in placing a blank in the machine, or removing it. When the blank is finished the screw 108 need be loosened but slightly to permit of the wedge being lifted. The bearing may then be shifted by means of the lever 114, fulcrumed at 115 and attached at 116 to the base of the bearing 102. For the purpose of adjustment, two sockets 116 are provided. When a new blank has been put in place the bearing is moved by the lever until the plunger strikes the blank, the wedge is then dropped into place, and a slight turn of the screw 108 is sufficient to clamp the blank.

If the timing gears have teeth of the proper size and shape, and if they are enmeshed to the proper depth, swinging one of them on the pivot whose axis passes through the point where the pitch circles touch, said axis being also tangent to both circles, will not affect the depth of enmeshment of their teeth, and hence there will be no change in the amount of backlash between the gears. As the die-roll is attached to one of the timing gears, and the blank to the other timing gear, each being substantially integral with its respective gear during the time the rolling operation is in progress, it follows that an imaginary circle, which when the gear is finished will be its pitch circle, and which will just touch the pitch circle of the die-roll when its teeth shall have been sunk to the proper depth in the blank, will have traveled at the same lineal velocity as the pitch circle of the die roll all of the time the rolling operation was in progress. In fact, the velocity of the pitch circles will be equal even before the blank and die roll come into contact with each other. In other words there can be no rotary advance of either with reference to the other.

The action of the die roll teeth on the blank, due to the maintenance of equal lineal velocity of the pitch circles will now be explained:

Once during each revolution of the die roll each of its teeth attains a position where it is bisected by an imaginary straight line drawn from the axis of the die roll to the axis of the blank. That is, once during each revolution each tooth of the die roll points directly at the axis of the blank. If by any means a mark—a mere point—could be made on the blank, coinciding with a mark at the center of the point of each tooth in the die roll at the moment when each mark coincides with said bisecting line, this being continued until the rolling of the teeth is completed, it would be found that a line drawn through each group of points on the blank would be straight, and in a plane radial to its axis. From this it is clear that the teeth of the die roll enter the blank on a line coincident with a radial plane. In other words, the progressive deepening of each space in the blank is along a straight line leading to the axis of the blank. This gives great strength to the teeth for the same reason that rolled metal has greater strength longitudinally than transversely. What is commonly referred to as the "grain" of rolled metal runs parallel to the direction in which it moved in passing through the rolls, and the metal has greater tensile strength parallel to than across the grain. The action of the die is analogous to that of the rolls, and if the grain were indicated by lines the lines would run approximately parallel to the two surfaces, thus forming a symmetrical figure resembling a pyramid. The normal strain on the teeth puts one side in tension and the other side in compression and it is seen from the foregoing that these strains are longitudinal with reference to the grain of the metal.

The distance from the pivot on which the die roll swings to its vertex, equals the distance from the pivot to the vertex of the blank, and this equality is constant. It is clear, therefore, that there is no radial displacement between the die roll and blank. In other words, there is no relative movement between the die roll and blank along the lines of their pitch radii.

It will be obvious to any skilled mechanic that the die roll and blank may, by very simple modifications in the means for connecting them to their respective timing gears, be transposed. That is, the die roll might be mounted on shaft 78 and be as large as the blank now carried by that shaft, and the blank be mounted on shaft 93 and be the size of the present die roll. Furthermore, two gears adapted to run together might be mounted in place of the blank and die roll respectively, and run together for the purpose of smoothing up or polishing their teeth. Gears which have warped slightly in hardening might by this means be restored. If necessary an abrasive may be applied to the teeth while the gears are being run together.

The spur gear machine shown in Figs. 8, 9 and 10, operates on substantially the same principle as the bevel machine. In this machine the transposition of the die-roll and blank above suggested is carried out. That is, the blank 125 is mounted on a shaft which rotates in a bearing 126, this bearing being carried by a plate 127 arranged to swing on a pivot 128. A gear 129 is secured to said shaft and meshes with a gear 130 secured to a shaft 131, said shaft also carrying the die-roll 132. By means of gears 133, 134 and 135 shaft 131 is arranged to drive a shaft 136 which carries what I call a breaking-down die-roll, 137. By means of the screw 138 and hand wheel 139 the plate 127 may be swung on its pivot 128 so as to bring the blank into engagement with either of the die-rolls. As in the bevel gear machine, the axis of pivot passes through the point of contact of the pitch-circles of gears 129 and 130. As the axis lies in the plane of the sides of the gears it follows that the depth of enmeshment of the gears 129 and 130 is not affected by swinging the plate 127 on the pivot and synchronous relations are therefore maintained between the teeth of the die-roll and the developing teeth on the blank. A more extensive description of this machine may be found in my pending application Serial No. 643,010. As evidenced by the fact that the bevel machine here described has but a single die-roll it is obvious that the breaking-down die-roll is not essential in the operation of rolling gears.

In carrying out the broad principles of my invention it is not essential that the timing gears be larger in diameter than the die roll and blank.

What I claim is as follows:

1. In a machine for rolling gears, the combination of a pair of gears rotatably mounted with their teeth enmeshed and their axes forming an angle, said teeth being of such relative size and shape that when mounted as aforesaid there will be substantially no backlash between them; a toothed die roll mounted in such manner that it and one of the gears are substantially integral, a blank holder mounted in such manner that it and the other gear are substantially integral, and means for varying the angle formed by said axes to bring the die roll and a blank carried by the holder into contact, and for continuing said variation until teeth have been formed on the blank, said means effecting the continued variation without changing the amount of backlash between the gears.

2. In a machine for rolling gears, the combination of a pair of gears rotatably mounted with their teeth enmeshed and their axes forming an angle, a toothed die roll mounted so it and one of said gears are substantially integral, a blank-holder mounted so it and the other gear are substantially integral, means for varying the angle formed by said axes to bring the die roll and the blank carried by the holder into contact, and for continuing said variation until teeth have been formed on the blank, and means for maintaining such relations between the gears while the tooth forming operation progresses as will prevent rotary advance of either with reference to the other.

3. In a machine for rolling gears, the combination of a pair of gears rotatably mounted with teeth enmeshed and their axes forming an angle, a toothed die roll mounted so it and one of said gears are substantially integral, a blank holder mounted so it and the other gear are substantially integral, means for varying the angle formed by said axes to bring the die roll and a blank carried by the holder into contact, and for continuing said variation until teeth have been formed on the blank, and means for keeping the teeth of the gears at a uniform depth of enmeshment while the tooth-forming operation progresses.

4. In a machine for rolling gears, the combination of a pair of gears rotatably mounted with their teeth enmeshed and their axes forming an angle, a toothed die roll mounted so it and one of the gears are substantially integral, said die roll being of different diameter from the gear it is attached to, a blank holder mounted so it and the other gear are substantially integral, means for producing movement of approach between the die roll and the blank carried by the holder, and means for maintaining uniform depth of enmeshment of the gear teeth while said movement of approach continues.

5. In a machine for rolling gears, the combination of a die roll and a blank holder, each rotatably mounted with their axes forming an angle, and means for varying said angle to bring the die roll and a blank carried by the holder into contact, and for continuing said variation until teeth are formed on the blank, and means for preventing rotary advance of either the blank or the die roll, each with reference to the other.

6. In a machine for rolling gears, the combination of a die roll and a blank holder, each rotatably mounted with their axes forming an angle, means for varying said angle to bring the die roll and a blank carried by the holder into contact, and for continuing said variation until teeth are formed on the blank, and means for maintaining uniform speed ratio between the die roll and the blank while said angular variation progresses.

7. In a machine for rolling bevel gears, the combination of a pair of timing gears rotatably mounted with their teeth enmeshed and their axes forming an angle, a die roll having a working face complementary to the working face of a bevel gear, mounted to rotate upon the same axis as one of the timing gears, a blank holder mounted to rotate upon the same axis as the other timing gear, and means for varying the angle formed by said axes without altering the depth of enmeshment of the timing gears, said variation in angle being such as to bring the die roll and the holder toward each other, whereby the working face of the rotating die roll may be caused to roll against the working face of a blank carried by the holder and form teeth thereon.

8. In a machine for rolling bevel gears, the combination of a die roll having a working face conjugate to the working face of a bevel gear, and a blank holder, said die roll and blank holder being rotatably mounted with their axes forming an angle; means for varying said angle to bring the die roll and a blank carried by the holder into contact to form teeth on the blank, and means for maintaining uniform speed ratio between the die roll and the blank all the time the tooth forming operation is in progress.

9. In a machine for rolling bevel gears, the combination of a die roll having a working face conjugate to the working face of a bevel gear, and a blank holder, said die roll and blank holder being rotatably mounted with their axes forming an angle; means for varying said angle and thereby producing movement of approach between the die roll and a blank carried by the holder, said means enabling said movement of approach to be continued until the die roll has impressed its form upon the blank, and means for maintaining uniform speed ratio between the die roll and the blank all the time the movement of approach continues.

10. In a machine for rolling gears, the combination of a pair of timing gears rotatably mounted with their teeth enmeshed and their axes forming an angle, a die roll mounted to rotate in unison and an axial alinement with one of the timing gears, said gear and die roll being of different diameters; means for mounting a gear blank so it will rotate in unison and in axial alinement with the other timing gear, means for producing relative movement of approach between the die roll and blank whereby they may be brought into contact for the purpose of rolling the blank, means for effecting said movement of approach without varying the depth of enmeshment of the timing gears, and means for preventing radial displacement of the die roll and blank, each relative to the other.

11. In a machine for rolling teeth on gears the combination of a die roll having a working face conjugate to the working face of a bevel gear, and a blank holder, said die roll and blank holder being rotatably mounted; means for rotating them, means for producing relative movement of approach between the die roll and holder, whereby the former and a blank carried by the holder may be brought into contact, and whereby said movement of approach may be continued thereafter until the die roll has formed teeth on the blank, means for maintaining uniform speed ratio between the die roll and blank all the time the movement of approach and said tooth forming operation continues, and means for preventing radial displacement of the die roll and blank, each relative to the other.

12. In a machine for rolling teeth on gears, the combination of a die roll having a working face conjugate to the working face of a bevel gear, and a blank holder, said die roll and blank holder being rotatably mounted; means for rotating them, means for producing relative movement of approach between the die roll and holder, whereby the former and a blank carried by the holder may be brought into contact, and whereby said movement of approach may be continued thereafter until the die roll has formed teeth on the blank, means for maintaining uniform speed ratio between the die roll and blank all the time said movement of approach and said tooth forming operation continues, and a positive connection between the die roll and blank holder which prevents radial displacement of one with reference to the other.

13. The combination of a bevel gear die roll, and a blank holder, both of which are rotatably mounted with their axes forming an angle, means for rotating them, and means for varying the angle formed by said axes and thereby bringing the rotating die roll and a blank carried by said holder into contact; said means enabling the variation in angularity to continue after the die roll and blank are engaged and until the face of the blank has been rolled into a conjugate of the face of the die roll.

14. The combination of a die roll, a blank holder, both of which are rotatably mounted with their axes forming an angle, means for rotating them, means for varying the angle formed by said axes and thereby bringing the rotating die roll and a blank carried by said holder into contact, said means enabling the variation in angularity to continue after the die roll and the blank are engaged and until the face of the blank has been rolled into a conjugate of the face of the die roll, and means for maintaining uniform speed ratio between the blank and the die roll all the time the rolling operation is in progress.

15. In a machine for rolling gears, the combination of a pair of gears having tapered converging teeth, said gears being rotatably mounted with their teeth enmeshed to a depth which substantially precludes back-lash, a die roll having a working face conjugate in essential particulars to the working face of the gear it is designed to roll, mounted to rotate in unison and in axial alinement with one of the gears, means for mounting a blank so it will rotate in unison and in axial alinement with the other gear, and means for moving one of the gears upon an axis tangent to its pitch circle and which passes through the point where the pitch circles of the gears touch, together with the member mounted to rotate in unison and in axial alinement with it, for the purpose of bringing the die roll and blank into contact with each other.

16. In a machine for rolling gears, the combination of a pair of gears having tapered converging teeth, said gears being rotatably mounted with their teeth enmeshed to a depth which substantially precludes back-lash, a die roll having a working face conjugate in essential particulars to the working face of the gear it is designed to roll, mounted to rotate in unison and in axial alinement with one of the gears, means for mounting a blank so it will rotate in unison and in axial alinement with the other gear, and means for swinging the die roll and the gear to which it is attached upon an axis tangent to its pitch circle and which passes through the point where the pitch circles of the gears touch, thereby causing it to contact with the blank, said means enabling the continuation of said swinging movement until the die roll has been sunk to a sufficient depth into the blank to convert its face into a conjugate of the face of the die roll.

17. In a machine for rolling bevel gears, the combination of a base, a timing gear and a blank-holder so connected as to rotate in unison in a stationary bearing carried by the base; and a second timing gear and a die roll so connected as to rotate in unison in a bearing pivotally attached to the base, the pivotal attachment being so located with reference to the gears that their teeth are thereby kept enmeshed to such depth that their pitch circles touch, the axis of the pivot passing through their point of contact on a line tangent to each circle.

18. In a machine for rolling bevel gears the combination of a base, a timing gear and a blank-holder so connected as to rotate in unison in a stationary bearing carried by the base; a second timing gear and a die roll so connected as to rotate in unison in a bearing pivotally attached to the base, the pivotal attachment being so located with reference to the gears that their teeth are thereby kept enmeshed to such depth that their pitch circles touch, the axis of the pivot passing through their point of contact on a line tangent to each circle, and means for adjusting the position of the pivot to accommodate timing gears of different sizes, the movement of the pivot with reference to each gear being along a line coincident with its pitch plane.

19. In a machine for rolling bevel gears, the combination of a base, a timing gear and a blank-holder so connected as to rotate in unison in a stationary bearing carried by the base; a second timing gear and a die roll so connected as to rotate in unison in a bearing pivotally attached to the base, the pivotal attachment being so located with reference to the gears that their teeth are thereby kept enmeshed to such depth that their pitch circles touch, the axis of the pivot passing through their point of contact on a line tangent to each circle, and means for moving the second bearing on its pivotal axis to bring the die roll into contact with a blank carried by the holder to form teeth on it.

20. In a machine for rolling bevel gears, the combination of a base, a timing gear and a blank-holder so connected as to rotate in unison in a stationary bearing carried by the base; a second timing gear and a die roll so connected as to rotate in a bearing pivotally attached to the base, the pivotal attachment being so located with reference to the gears that their teeth are thereby kept enmeshed to such depth that their pitch circles touch, the axis of the pivot passing through their point of contact on a line tangent to each circle, means for moving the second bearing on its pivotal axis to bring the die roll into contact with a blank carried by the holder to form teeth on it, and a stop to limit said movement.

21. In a machine for rolling bevel gears, the combination of a base, a bevel timing gear and a blank-holder so connected as to rotate in unison, mounted in a bearing carried by the base; a second timing gear and a die roll so connected as to rotate in unison, mounted in a second bearing carried by the base; a pivot connecting said bearings and holding them in such position that the teeth of the timing gears are enmeshed to such depth that their pitch circles touch, the axis of the pivot passing through said point of contact on a line tangent to each circle, and means for producing relative movement of the bearings about said axis whereby to bring the die roll into contact with a blank carried by the holder.

22. In a machine for forming gears, the combination of a pair of gears rotatably mounted with their teeth enmeshed, said teeth being of such relative size and shape that when mounted as aforesaid there will be substantially no backlash between them; a toothed die roll mounted to rotate in unison with one of said gears, and a blank holder mounted to rotate in unison with the other gear, the axes of said die roll and holder forming an angle; and means for varying the angle formed by said axes to bring the die roll and a blank carried by the holder into contact and for continuing the variation until teeth have been formed on the blank, said means effecting the variation in angle without changing the amount of backlash between the gears.

23. In a machine for rolling gears, the combination of a pair of gears rotatably mounted with their teeth enmeshed and their axes forming an angle, said teeth being of such relative size and shape that when mounted as aforesaid there will be substantially no backlash between them; a toothed die roll mounted to rotate in unison with one of said gears, a blank holder mounted to rotate in unison with the other gear, the axes of said die roll and holder also forming an angle; and means for varying the angle formed by the axes of said die roll and holder to bring the former and a blank carried by the holder into contact and for continuing said variation until teeth have been formed on the blank, said means effecting the variation without changing the amount of backlash between the gears.

24. In a machine for rolling gears, the combination of a pair of gears rotatably mounted with their teeth enmeshed and their axes forming an angle; a toothed die roll mounted to rotate in unison with one of said gears, and a blank holder mounted to rotate in unison with the other gear, the axes of the die roll and blank also forming an angle; means for varying the angle formed by the axes of the die roll and holder to bring the former and a blank carried by the holder into contact and for continuing said variation until teeth have been formed on the blank, and means for maintaining such relations between the gears while the tooth forming operation progresses as will prevent rotary advance of either with reference to the other.

25. In a machine for rolling bevel gears, a die-roll, means for mounting a blank, means for varying the angle to be formed by the axes of the die-roll and blank when rolling of the blank is completed, and means independent of contact between the die-roll and blank for rotating them.

26. In a machine for rolling bevel gears, means for mounting a die-roll, said means being adapted to mount die-rolls of various kinds, means for mounting a blank, means for varying the angle which shall be formed by the axes of the die-roll and blank when rolling of the blank is completed, and means independent of contact between the die-roll and blank for rotating them.

27. In a machine for rolling bevel gears, a die-roll adapted to roll a bevel gear having fewer teeth than itself, a blank-holder capable of holding a blank which is to have fewer teeth than the die-roll, and means for producing relative motion between the die-roll and blank whereby a smaller number of teeth is rolled on the blank than the die-roll has.

28. In a gear rolling machine, in combination; means for supporting a rotating gear blank; a toothed die-roll for impressing teeth on the blank; means for producing relative movement of approach between the blank and toothed die-roll contemporaneous with and for the purpose of forming said teeth; and means for maintaining equal velocity at the pitch lines of the blank and the toothed die-roll while said teeth are being formed.

29. In a gear rolling machine, in combination; means for supporting a rotating gear blank; a toothed die-roll for impressing teeth on the blank; means for producing relative movement of approach between the blank and the toothed die-roll contemporaneous with and for the purpose of forming said teeth: and means for maintaining synchronous relations between the teeth on said die-roll and the teeth on the blank while said teeth are being formed.

30. In a gear rolling machine, in combination; means for supporting a gear blank; a toothed die-roll; means for producing relative movement of approach between the blank and toothed die-roll and contemporaneously imparting motion to said die-roll, whereby to impress teeth on the blank; and means whereby, while the tooth forming operation proceeds, synchronous relations are maintained between the teeth on said die-roll and those on the blank.

31. A machine for forming gears by hot rolling comprising a rotatable gear blank support, a die-roll for forming teeth on the blank, means for producing relative movement of approach between the rotatable blank support and the die-roll, and means for simultaneously rotating said die-roll and blank support at a fixed velocity ratio, whereby the pitch line velocities of said die-roll and gear blank are maintained equal throughout the forming operation.

32. In a machine for rolling bevel gears, a die-roll adapted to roll a bevel gear having a different number of teeth than there are on the die-roll itself, a support for a blank, and means for causing the die-roll to roll a different number of teeth on said blank than there are on the die-roll, said means comprising a timing mechanism for rotating the die-roll and blank at different angular velocities.

33. In a machine for rolling bevel gears. a die-roll adapted to roll a bevel gear having a different number of teeth than there are on the die-roll itself, a blank-holder, and means independent of the contact of the die-roll with the blank for producing relative motion between the die-roll and blank-holder whereby a different number of teeth is formed on the blank than there are on the die-roll.

34. A machine for rolling teeth on gears, comprising means for supporting a blank, a die-roll having teeth which taper along its pitch-surface, means for pressing the die-roll and blank together, and means independent of the contact of the die-roll with the blank for producing, contemporaneously with said pressure, relative movement whereby the die is rolled on the face of the blank.

35. In a machine for rolling bevel gears, a die-roll, means for mounting a blank, means for bringing the blank and the working face of the die-roll into any desired relative position, thereby enabling the die-roll to act upon blanks of different sizes, whereby with said die-roll bevel gears having various numbers of teeth may be rolled, and means for maintaining synchronous relations between the die-roll teeth and the teeth which are being formed on the blank.

36. In a gear rolling machine; means for carrying a gear blank the teeth on which have been partially formed, a rotary tool enabled by rolling engagement therewith to finish the teeth on said blank, means for producing relative movement of approach between the blank and said tool contemporaneous with and for the purpose of finishing said teeth, and means for maintaining synchronous relations between the tool and the teeth on the blank while said finishing operation progresses.

In testimony whereof I affix my signature.

HAROLD N. ANDERSON.